United States Patent [19]

Jantzen

[11] 4,250,644
[45] Feb. 17, 1981

[54] HAND HELD MICROFILM READER

[75] Inventor: Johannes K. Jantzen, Mountain View, Calif.

[73] Assignee: Topex, Inc., Palo Alto, Calif.

[21] Appl. No.: 968,138

[22] Filed: Dec. 11, 1978

[51] Int. Cl.³ .................. G02B 27/02; A47B 91/00; F21S 1/06; G03B 21/00

[52] U.S. Cl. .................................. 40/367; 40/362; 40/495; 40/363; 248/349; 362/368; 339/44 R; 353/87; 353/121; 29/25.13

[58] Field of Search .................. 40/361, 362, 363, 367, 40/361.3, 158 B; 353/27 R, 39, 121, 85, 43, 110, 27 A, 68, 73, 79, 87, 122; 248/349; 339/144 R, 221 L, 273 S; 362/226, 418, 430, 444, 448, 457, 257, 368, 370; 29/25.13; 356/121, 122, 130

[56] References Cited

U.S. PATENT DOCUMENTS

| 2,892,274 | 6/1959 | Afton | 40/362 |
|---|---|---|---|
| 3,027,481 | 3/1962 | Baber et al. | 313/110 |
| 3,116,480 | 12/1963 | Fernquist | 362/368 |
| 3,188,512 | 6/1965 | Moore | 313/110 |
| 3,319,517 | 5/1967 | Rondas et al. | 353/43 |
| 3,539,263 | 11/1970 | Waters | 356/130 |
| 3,588,240 | 6/1971 | Asano | 353/85 |
| 3,756,710 | 9/1973 | Taylor | 353/43 |
| 4,059,351 | 11/1977 | Wisotsky | 40/362 |
| 4,063,365 | 12/1977 | Hopkins et al. | 356/121 |

Primary Examiner—Robert Peshock
Assistant Examiner—Michael J. Foycik, Jr.
Attorney, Agent, or Firm—Townsend and Townsend

[57] ABSTRACT

A hand held microfilm reader wherein the film is maintained within the reader housing and the controls for positioning the film are easily manipulated by one hand. An optical system provides an intense automatically focused image projected onto a screen for viewing by the user. The light source is a conventional lens end bulb that has been rendered uniformly directional by its having been mounted in pre-aligned relationship with respect to a clip which is configured to be precisely registered with remaining portions of the optical system.

5 Claims, 10 Drawing Figures

HAND HELD MICROFILM READER

FIELD OF THE INVENTION

This invention relates generally to microfilm reading equipment and more specifically to a hand held microfilm reader.

BACKGROUND OF THE INVENTION

It has become increasingly common to store photographically reduced printed information (alphanumeric and/or graphic) on microfilm in order to achieve a great reduction in the amount of space taken up by the printed information. The microfilm is typically generated according to one of three basic formats, commonly known as "microforms." These are: roll film, cards and microfiche.

Microfilm in the roll format is typically 16, 35, or 105 millimeters wide and is usually stored on a spool, a cartridge (having a single spool), or a cassette (having two spools). Information may be stored either in the comic mode wherein discrete batches of information contain data lines that are parallel to the length of the roll, or in the cine mode wherein a continuous batch of information contains data lines that run perpendicular to the roll length. The card microform is most commonly used for engineering drawings and includes a piece of microfilm mounted in a rectangular aperture punched in a cardboard card. The most common microform is the microfiche which is a cut piece of microfilm, typically including an eye legible title in addition to the reduced data. The most common microfiche size is 105 by 148 millimeters.

Microfilm requires a reader to produce an enlarged image (real or virtual) of the reduced data for viewing by the user. Broadly, microfilm readers may be classified into four categories: desk readers, lap readers, portable readers, and hand held readers.

Desk readers normally weigh in excess of 20 pounds and are intended to sit somewhat permanently on a desk, table top, or other work surface. Desk readers include a light source typically powered by a 110 volt line, a lens for image enlargement, and a projection screen. The microfilm is inserted within the reader and manipulated into a viewing position by an appropriate film transport mechanism. In the case of a spool or cassette, the mechanism would include spool driving means, typically motor driven. For microfiche the mechanism would include a stage for providing rectilinear motion of the microfiche.

The lap reader is similar in concept to the desk reader but is designed more compactly with a weight in the range of 5-12 pounds so that it may rest either on a work surface or in the user's lap. Some lap readers are provided with mechanical film transport means while others require that the user directly manipulate the film into the desired viewing position.

The portable reader is also similar in concept to the desk reader but is designed as separate components which either unfold from a portable compact package or are packaged as separate units, in both cases requiring that they be set up in the use position. The latter type generally have two major components, one including the lamp, lens and microfilm holder and the other including the screen.

Hand held readers differ from the above-described types in that they are designed to be held in one hand. Such readers typically do not project the image onto a screen, but rather use a magnifying lens to produce a virtual image. A battery powered lamp may be provided, but the simpler readers rely on ambient light for illumination. Due to the size of the hand held readers, the microfilm (normally in the form of a microfiche) protrudes from the reader and is maneuvered by the user in order to view the proper portion of the film.

It is clear that the concept of a hand held reader is extremely attractive since it renders the microfilm data base readily accessible to a large number of users at the same time without requiring the provision of a large work area to maintain a large number of desk readers. Moreover, users may make use of data in environments that are not normally conducive to microfilm usage. For example, service personnel can easily and conveniently carry large amounts of maintenance and repair information into the field with them.

However, certain disadvantages of hand held readers have rendered their use less than wholly satisfactory. One such disadvantage is that hand held readers have been designed for two handed use, with one hand holding the reader and the other hand manipulating the film. A second disadvantage, related to the use of the microfiche, is that the microfiche itself extends beyond the confines of the reader with the user manipulating the film by actually grasping the protruding fiche and manually positioning it. Such direct manipulation of the film, possibly inconvenient in itself, further subjects the film to handling that tends to soil it, possibly ultimately rendering it unfit for use. This problem is aggravated should the user require access to the data in a dirty environment such as a repair site, thus undercutting a major advantage of hand held readers to service personnel.

The desk reader, by providing mechanical manipulation of the film, and enclosure of the film within the confines of the reader, is not subject to these disadvantages, and further provides the viewer with an image projected on a screen. This is thought to be more desirable than a virtual image system since it allows more than one viewer to inspect the data at a given time, and is more natural for the viewer, being more like reading data printed directly on a printed page. However, an optical system for providing a sufficiently intense and well focused image on a screen has tended to be highly impractical in the environment of a hand held reader. The reasons that this should be so are best seen in view of a comparison between the desk reader and the hand held reader. In a desk reader where space is relatively unlimited, and where the source of electrical power is 110 volts from the wall socket, the light source can be made as intense as necessary. If heating is a problem, a fan may be provided. The hand held reader on the other hand is battery powered and very small, thereby making it difficult to provide a suitably intense source of light. There are on the market small, low voltage, incandescent bulbs having a lens integrally fabricated into the lamp envelope to provide a greater concentration of light. However, such "lens end" bulbs have tended to be unsatisfactory since the alignment of the lens relative to the base is insufficiently uniform to provide the maximum usable output within the angular tolerance of the hand held reader optical system.

In the context of a desk reader, focusing is not a problem since there is sufficient room for a mechanical focusing mechanism. Moreover, such a focusing mechanism, once set, is unlikely to be jarred by the user so as to require further setting. The hand held reader on the other hand does not have room for a reliable focusing mechanism, and further, the nature of the hand held reader is such that such a focusing mechanism is likely to be jarred during use.

Thus, while the concept of a hand held microfilm reader is a good one, such readers have tended to lack the desirable features of the desk readers, and the potential advantages have tended to go largely unrealized.

SUMMARY OF THE INVENTION

The present invention provides a hand-held microfilm reader which possess the desirable features of the desk readers. In particular, the film is maintained within the reader housing and the controls for positioning the film are easily manipulated by one hand. Additionally, the optical system of the reader of the present invention provides an intense automatically focused image projected onto a screen for viewing by the user.

The optical system comprises a lamp, a condenser lens, a microfilm image for enlargement and projection, a projection lens, mirrors for path bending, and a rear projection screen. The light source is a conventional lens end bulb that has been rendered uniformly directional by its having been pre-aligned with respect to a clip and rigidly mounted by its base to the clip. The clip is configured to be precisely registered with remaining portions of the optical system so that once the clip is inserted, the lamp, regardless of the lens orientation with respect to the base has its lens oriented precisely and repeatably with respect to the optical system. The clip, in addition to providing alignment of the lamp, provides an electrical connection to the lamp base and further facilitates handling of the rather small lamp, thereby making it possible to easily handle the lamp without special tools.

The microfilm is focused without the need for a separate focusing mechanism by having the emulsion side of the film gently pushed against a polished platen surface on the lens housing by a soft, smooth film gate element. Thus, regardless of variations in the film thickness, a well focused projected image is produced.

According to another aspect of the invention, the microfilm is in the form of a disk with the data formatted in columns and arranged in a series of cine mode frames in concentric rings. The film transport mechanism includes a slideable carriage and a turntable rotatably mounted to the carriage. The film disk has a central circular aperture which engages the turntable. Selection of the data segment to be read involves translating the carriage along a fixed direction to select a ring, and rotating the turntable to select a portion within the ring. Thus any particular portion of the data may be brought into alignment with the optical train.

Movement of the turntable carriage allows selection of the particular ring to be read. A finger engaging slide element is mounted to the carriage and protrudes outside the housing. A detent mechanism is provided to permit indexing of the turntable in the radial direction by increments corresponding to the radial separation of the data tracks. The detent mechanism includes a rack mounted to the fixed structure and a spring loaded pin mounted to the carriage. The pin engages the teeth of the rack and preferentially seats in a slot between two adjacent teeth to index the carriage. The slide element is provided with a pivoted release element that engages the pin to lift it out of the slot when the release element is depressed. The user is thus provided with a fine control. The rack itself may be mounted to undergo a small controlled movement along direction of carriage movement, thus providing a fine adjustment of the radial indexing to account for variations in the disk or the reader.

Rotation of the turntable allows data selection within a given ring. The turntable clasps the film disk only in a small region proximate the central aperture. Thus, the data carrying portions of the flexible disk are free to undergo limited movement perpendicular to the film plane so that the microfilm emulsion may be registered precisely to the platen by the film gate. A thumbwheel mounted to the fixed structure of the reader is mounted for rotation about an axis parallel to the turntable axis. Rotational motion of the thumbwheel is transmitted to the turntable by a spur gear arrangement including a movable idler gear that engages a gear on the turntable and a drive gear that is mounted to the fixed structure. The idler gear is constrained to have its center maintained at a fixed distance from the respective centers of the turntable gear and the drive gear so that the spur gear always engages both the turntable gear and the drive gear regardless of carriage position. This relationship may be achieved by providing an arm pivoted about the drive gear axis to which arm the idler gear is rotatably mounted, and by having a pin that extends through the center of the idler gear and engages a cam slot in the carriage. The cam slot is of arcuate configuration and is concentric with the turntable gear. The drive gear may be directly coupled to the thumbwheel in a coaxial arrangement, but it is preferable to provide reduction gearing so that control of the film disk by means of the thumbwheel may be effected more smoothly.

The turntable comprises paired clamp elements pivoted about a diametral axis of the turntable, each clamp element having a clamping portion at a first radially outermost end and a camming surface at a second end proximate the pivotal mounting. A flat spring engages the camming surfaces of the clamp elements to urge the clamping portions against the film edge. When the clamping elements are lifted, the spring urges the clamping portions away from the film. Thus, the clamping elements have two stable positions with respect to the spring. The spring is preferably stressed beyond its elastic limit during initial assembly to maintain a relatively constant force on the film regardless of tolerance. The disk as azimuthally indexed with respect to the turntable by a pin that engages a cooperating notch in the disk proximate the central aperture.

According to a further aspect of the invention, the housing has a door that opens to permit access to the turntable and film gate. The door is latched, with the latch engaging a portion of the carriage to permit opening of the door only when the carriage is moved to a position of maximum separation from the film gate, thus facilitating each loading of the film disk and insertion into the film gate.

According to a further aspect of the invention, the microfilm may be in the form of a strip mounted within a cassette with the film transport mechanism including a small motor for winding the cassette spools.

For a further description of the nature and advantages of the present invention, reference should be had to the following detailed description and attached drawings.

DETAILED DESCRIPTION OF THE INVENTION

Figure 1:
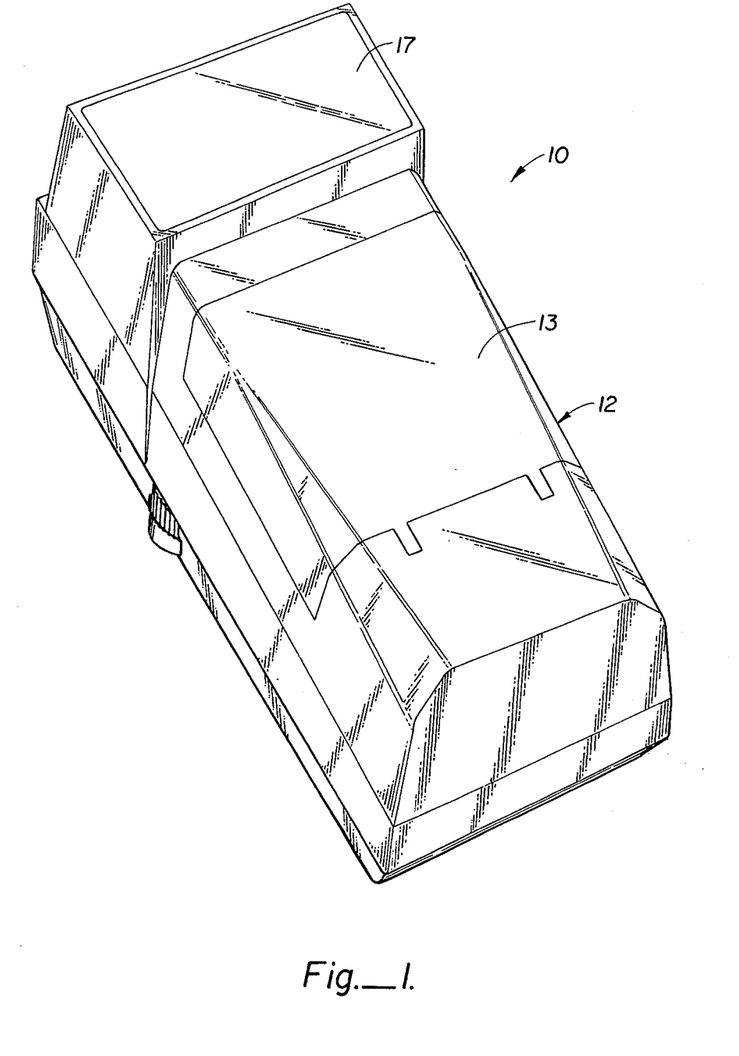
FIG. 1 is a perspective view of the exterior of a hand held microfilm viewer according to the present invention.
Figure 2:
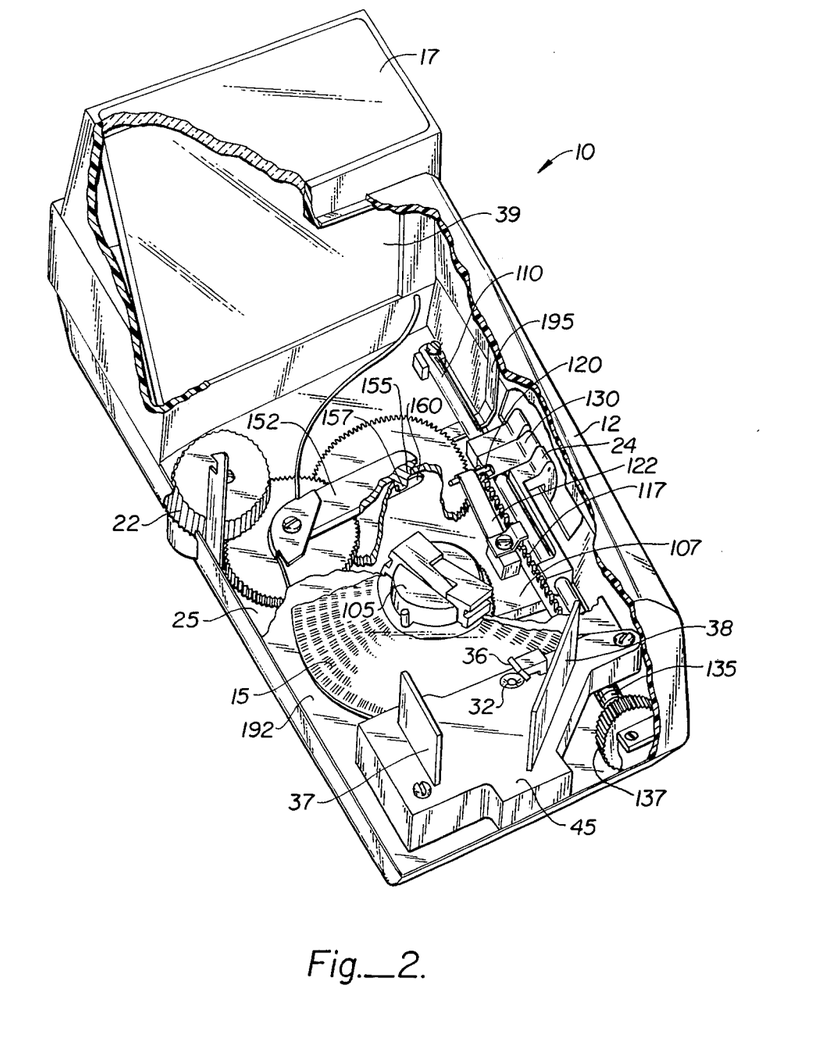
FIG. 2 is a perspective partially cut away view of the reader of FIG. 1.

FIG. 1 is a perspective view of the exterior of a microfilm viewer 10 according to the present invention. Reader 10 includes a housing 12 having a door 13 through which access to the interior may be had. FIG. 2 is a partially cut away perspective view showing the main internal components of reader 10. The basic function of reader 10 is the formation of a magnified image of photographically reduced data on a piece of microfilm 15, which image is projected onto a rear projection screen 17 for viewing by user. While the nature of a hand held reader is such that no orientation is preferred, occasional references to direction will assume the reader to be oriented with screen 17 horizontal.

Broadly, reader 10 includes an optical train and a film transport mechanism for bringing the appropriate segment of microfilm 15 into alignment with the optical train. Manually actuated elements 22 and 24, a thumbwheel and a slide element, respectively, are coupled to the film transport mechanism and protrude beyond the confines of housing 12. Housing 12 includes a base casting 25 which provides a rigid fixed structure to which the various parts are mounted as will be described below. While FIG. 2 illustrates an embodiment wherein microfilm 15 is in the form of a disk, the optical teachings of the present invention contemplate the use of a microfilm cassette as well.

Figure 3:
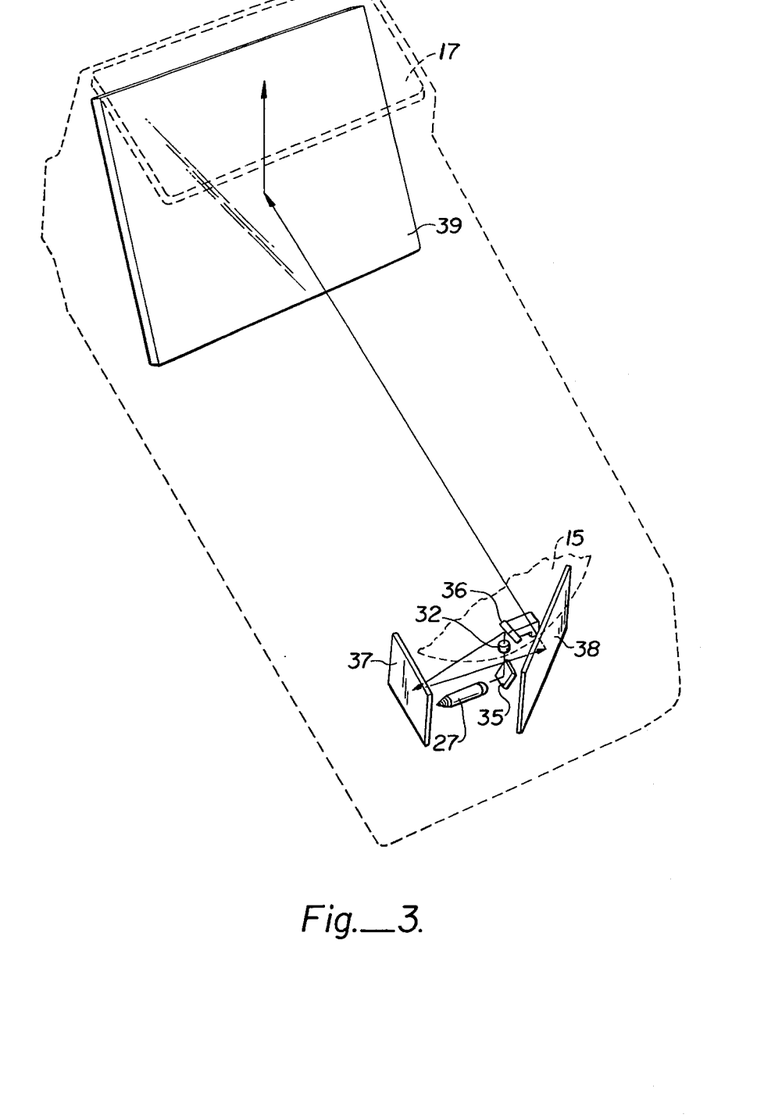
FIG. 3 is a perspective view showing the relative positioning of the elements in a suitable optical system.
Figure 4:
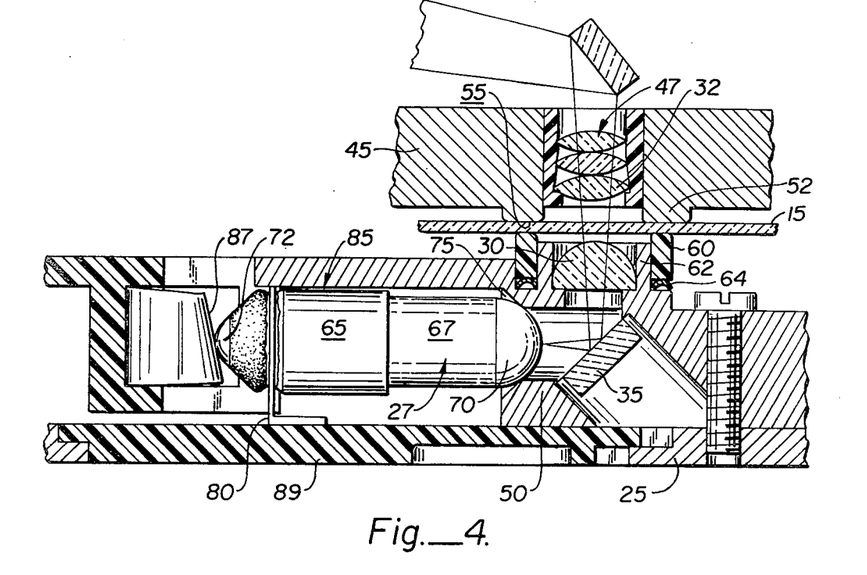
FIG. 4 is a sectional view of portions of the optical system.

Turning first to the optical system, and with additional reference to FIGS. 3 and 4, it can be seen that the optical train includes a light source 27, a condenser lens 30, an image forming projection lens 32, and, in the preferred configuration, five mirrors 35, 36, 37, 38, and 39. Mirrors 35-39 are high quality first surface mirrors of high reflectivity to minimize image degradation and intensity diminution. Mirror 35, located between light source 27 and film 15, provides a 90° bend so that light source 27 may be displaced laterally from the optical axis of lens 32. Light source 27 is preferably a lens end bulb having a dimension along its projection axis that is substantially greater than its transverse dimension. Accordingly the use of mirror 35 allows bulb 27 to be oriented with its axis perpendicular to the axis of lens 32, thereby permitted a more compact configuration.

Mirrors 36-39 serve two functions. First, they provide an image rotation of 90°. In principle, only two mirrors are required to provide such an image rotation, but the use of additional mirrors provide an optical path that is folded in order to achieve a greater optical path (and hence magnification) within the confines of a compact device.

As is best seen in FIG. 2, lens 32 and image mirrors 36-38 are mounted to a rigid block 45 to maintain alignment among themselves, block 45 being bolted to base casting 25. Block 45 has a cylindrical bore 47 which defines a lens housing for lens 32. Light source 27, mirror 35, and condenser lens 30 are mounted to a second rigid block 50 which is also bolted to base casting 25. Mirrors 36-38 are mounted to block 45 in precise alignment by an adhesive fixturing technique known to those skilled in the art. Broadly, each mirror has an oversized slot in block 45 to permit a degree of movement prior to the glue fixturing. The reflecting surfaces of the mirrors are aligned with a tool, and while in position, the oversized slots are filled with an adhesive which, when set, holds the mirrors in the precise alignment defined by the tool.

Block 45 has a normally downwardly protruding portion 52 surrounding lens housing bore 47. Protruding portion 52 has a highly polished lower surface 55 to define a platen, and lens 32 is positioned within lens housing bore 47 so that when the emulsion surface of film 15 is against polished platen surface 55, the image on screen 17 is in focus. Film 15 is maintained in contact with polished surface 55 by a spring loaded film gate 60. Film gate 60 is of a smooth relatively soft material such as nylon to minimize scratching, and has a generally annular configuration. Film gate 60 is maintained in axial alignment with the optical system by an annular protrusion 62 on optical block 50. A gentle spring effect is achieved by any suitable spring of low spring constant, a "wavy washer" spring 64 being preferred.

Having described the alignment and configuration of the image forming portion of the optical train, the illumination portion may now be described. Electrical power for light source 27 is provided by one or more batteries, typically rechargeable, of suitable size mounted in a compartment underneath and behind mirror 39. As stated above, light source 27 is preferably a lens end bulb of standard manufacture. Bulb 27 is of overall cylindrical configuration and includes a metal base 65, a glass envelope 67, a lens 70 molded integrally into the end of envelope 67 remote from base 65, and an electrical terminal 72 insulated from lamp base 65. A filament, not shown, within bulb 27, provides illumination when a voltage is applied between lamp base 65 and electrical terminal 72. The function of lens 70 is to provide a relatively narrow pencil of light when the filament is illuminated. However, it has been found that such bulbs of standard manufacture are not sufficiently uniform that the direction of the pencil of light is within the narrow tolerances required for the optical system being described herein.

Figure 5:
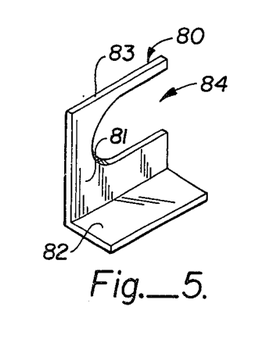
FIG. 5 is a perspective view showing a clip for mounting a lens end bulb.

Lamp 27 is aligned relative to the remaining portions of the optical system by registering lens 70 to a frustoconical hole 75 in optical block 50. Due to the non-uniform directionality of the bulbs, it is necessary for each given bulb to be aligned at an angle peculiar to that particular bulb. This is accomplished by a metal clip 80 as best seen with additional reference to FIG. 5. Clip 80 includes mutually perpendicular rectangular portions 81 and 82, with an edge 83 of the clip portion 81 remote from portion 82 defining a reference frame. Portion 81 is provided with a slot 84 sized to accommodate lamp base 65. Prior to its being mounted in reader 10, base 65 is mechanically positioned within slot 84, aligned so that the pencil of light is in a fixed predetermined relationship with respect to edge 83 of clip 80, and soldered to clip 80. These operations are preferably carried out at the factory where readers are made, and the lamp/clip assemblies provided to users as field replaceable parts. The entire assembly of lamp and clip is then mounted within optical block 50. Optical block 50 has portions defining a downwardly open trough 85 which constrains clip 80 against movement generally perpendicular to the axis of lamp 27. A gentle leaf spring 87 bears against end terminal 72 of lamp 27, seating lens 70 in a frustoconical hole 75 and further providing electrical connection from a first battery terminal to lamp terminal 72. The remaining portion of the electrical connection is provided by electrically coupling a second battery terminal to optical block 50 which is electrically connected to metal clip 80, itself soldered to lamp base 65. Leaf spring 87 has a slightly twisted configuration so that in addition to urging the lamp into frustoconical hole 75 and providing electrical contact with terminal 72, it further tends to urge clip edge 82 into a seating position within channel 85. Access to trough 85 is preferably through a small door 89 on the underside of reader 89 on the underside of reader 10, which door also maintains clip 80 in position.

Figure 6:
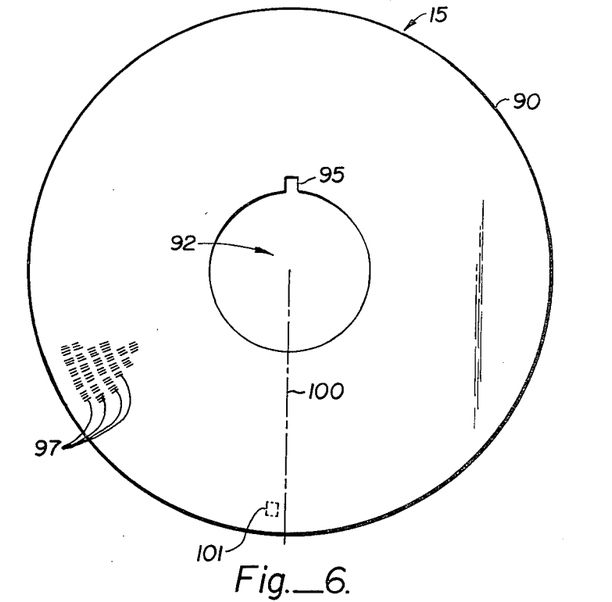
FIG. 6 is a plan view illustrating a preferred microfilm format.

FIG. 6 shows the data organization on a microfilm disc according to the present invention. Microfilm disc 15 has an outer periphery 90 defining an outer diameter, and a central circular aperture 92. A portion of the film adjacent aperture 92 is removed to define a small notch 95. Data is stored on disc 15 in a series of concentric rings 97, the data in each ring comprising a continuous column of radially extending data lines. A given column of data begins proximate a radial line 100 diametrically opposite notch 95 and continues in a clockwise direction, either ending proximate radius 100 or at some other intermediate point. A portion 101 of the radially outermost ring proximate radius 100 may be dedicated to an index for the data on the entire disc. It will be immediately appreciated that film disc 15 must be rotated and translated in order to bring a given data segment into operative alignment with the optical path described above. Referring generally to FIG. 2, and also to FIGS. 7A and 7B, the major elements of a suitable film transport mechanism may be seen. Film disc 15 is mounted to a turntable 105, and turntable 105 is rotatably secured to a carriage 107.

Carriage 107 undergoes sliding movement along a bar 110 mounted to base casting 25 and is constrained against rotation about bar 110 by a fixed bearing plate 112. Translation of carriage 107 provides a selection of the concentric ring from which data is to be read and shows up on screen 17 as a horizontal movement. The user effects translational movement by manipulating slide element 24 which protrudes beyond housing 12 and is mechanically coupled to carriage 107. Since the concentric rings are spaced equally, indexing of the disc is accomplished by moving carriage 107 by equal increments. A detent mechanism for such incremental movement includes a rack 117 that is connected to base casting 25 and extends in the direction of bar 110. A pin 120 is oriented perpendicular to bar 110 to engage the teeth of rack 117. Pin 120 is coupled to carriage 107 by a leaf spring 122 which urges pin 120 into a seating arrangement in one of the slots between two adjacent teeth.

A slide release element 130 incorporated into slide element 24 pivots on a shaft 131 housed in slide element 24 and rests against pin 120. Depression of slide release element 130 causes a pivoting movement which lifts pin 120 out of a tooth slot, thereby freeing the carriage for movement. After the carriage has been moved to the proper position, slide release element 130 is released and the spring pressure on pin 120 guides pin 120 into the precisely positioned rack slot for proper indexing.

Rack 117 is permitted to undergo a limited amount of movement along the direction of carriage travel in order to provide a fine adjustment of the overall radial indexing. To this end, rack 117 is rigidly affixed to a threaded rod 135, and a thumbwheel 137 which is constrained against motion along the axis of threaded rod 135 threadably engages rod 135. Accordingly, rotational motion of thumbwheel 137 causes translational motion of threaded rod 135 (and rack 117 therewith). Thus, the user is able to make small adjustments to the radial indexing (horizontal on the screen) to accommodate situations where the rings are not at the proper radius or where the data is not concentric with the central aperture. Additionally, tolerances in the overall construction of reader 10 are taken into account.

Figure 7A:
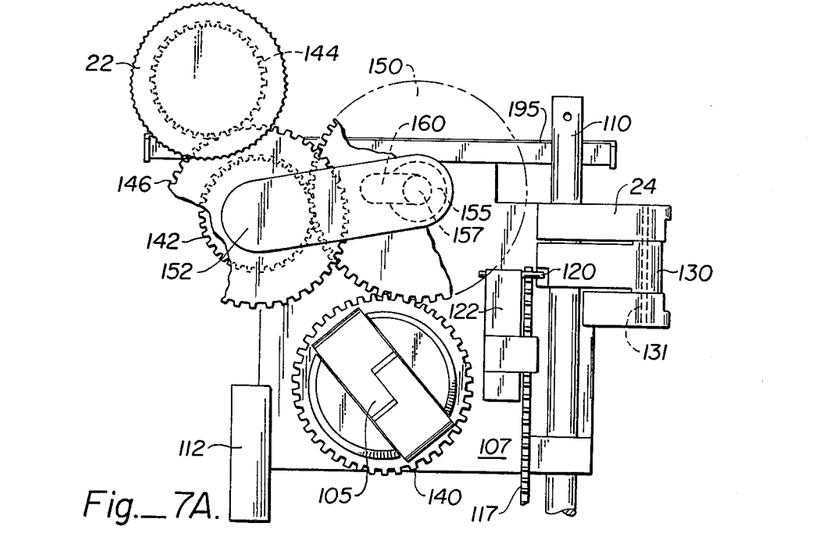
FIGS. 7A and 7B are top plan views illustrating the relative positions of gear for transmitting movement of a thumbwheel to a turntable mounted to a carriage for different positions of the carriage.
Figure 7B:
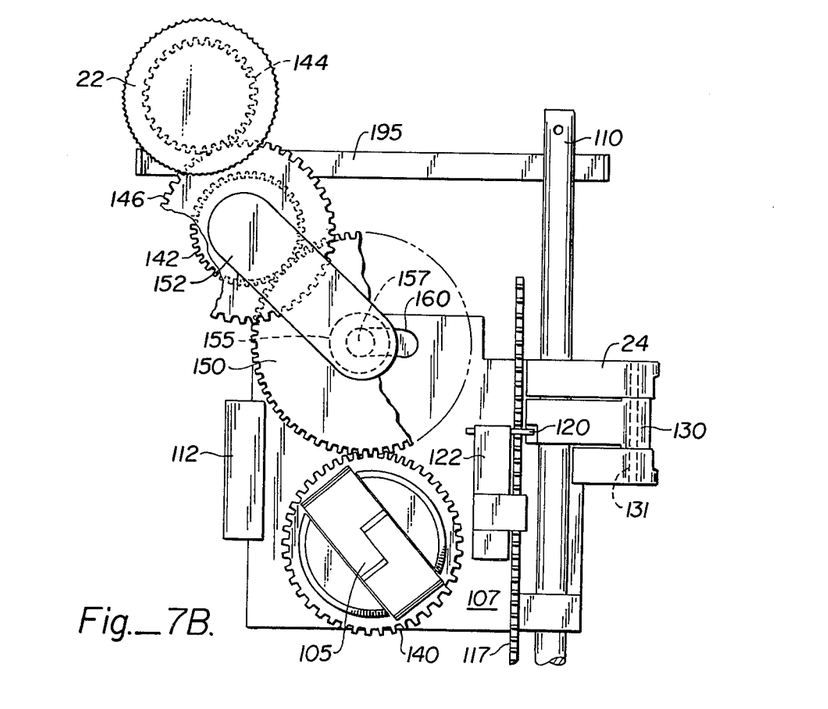

Turntable 105 is mounted for rotation on carriage 107, and is coupled to thumbwheel 22 for manipulation by the user. FIGS. 7A and 7B illustrate a spur gear arrangement for providing a positive mechanical connection between thumb wheel 22 and turntable 105 for all positions of carriage 107. Turntable 105 is rigidly mounted to a coaxial turntable gear 140. A drive gear 142 is itself coupled to thumbwheel 22 by intermediate reduction gears 144 and 146 which are rigidly mounted in coaxial relationship to thumbwheel 22 and drive gear 142, respectively. The sole function of reduction gears 144 and 146 is to allow the user to have a precise control over the angular positioning of turntable 105.

Rotational motion of drive gear 142 is transmitted to turntable gear 140 by a movable idler gear 150. In order to accommodate translational movement of carriage 107, (and turntable gear 140 therewith), idler gear 150 is allowed to move, but is constrained so that its center remains at fixed distances from the centers of gears 140 and 142. With additional reference to FIG. 2, a suitable mechanism to effect this constraint may be seen. A fixed separation with respect to gear 142 is provided by an arm 152 pivoted about the axis of rotation of gear 142 and further having a boss 155 about which gear 150 rotates. Arm 152 also carries a pin 157 coaxial with boss 155 and of smaller diameter. Carriage 107 has an arcuate slot 160 defined with a center of curvature at the center of turntable gear 140 and a radius equal to the required separation between the centers of gears 140 and 150. Slot 160 is sized to accommodate pin 157 which rides in the slot and maintains idler gear 150 at the required separation. As can be seen in FIGS. 7A and 7B, movement of carriage 107 along bar 110 causes pin 157 to move along slot 160 as arm 152 rotates about the center of gear 142.

Figure 8:
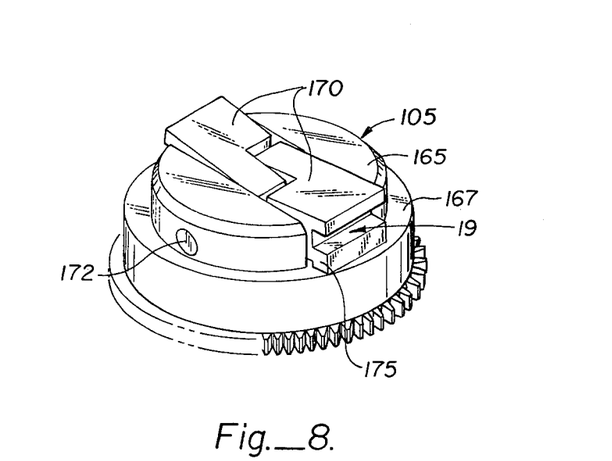
FIG. 8 is a perspective view of a preferred embodiment of the turntable clamping mechanism.
Figure 9:
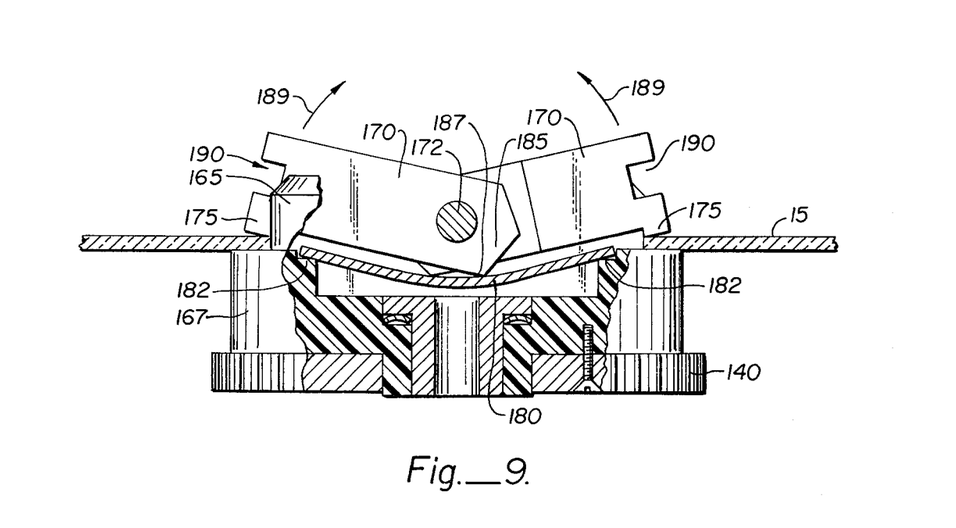
FIG. 9 is a side elevational view, partially cut away, of the turntable of FIG. 8.

FIGS. 8 and 9 show in perspective and partially sectioned elevational view, respectively, a preferred construction of turntable 105. Turntable 105 includes a body having coaxial cylindrical portions 165 and 167. The diameter of cylindrical portion 165 is equal to the diameter of central aperture 92 of film disc 15, while cylindrical portion 167 has a larger diameter to define a flat shoulder on which film disc 15 may seat. The turntable body is channelled to accommodate a pair of opposed clamp elements 170 pivoted about a shaft 172 mounted diametrically with respect to turntable 105. A first end of each clamp element 170 has a clamping portion 175 for engaging a region of film 15 proximate central aperture 92 and holding it against the flat shoulder of body portion 167. A flat spring 180 is mounted within the channel in the turntable body and is seated on paired shoulders 182 provided for that purpose. A second end 185 of each clamp element 170 is bounded by a camming surface 187 which engages spring 180. Clamp elements 170 have two stable positions. In the first stable position, illustrated in FIGS. 8 and 9, clamping portions 175 engage film 15 to hold it to cylindrical portion 167. The other stable position is with clamping elements 170 raised toward the axis of rotation of turntable 105 in the direction indicated by arrows 189 to permit removal or mounting of film. Camming surfaces 187 are shaped for maximum engagement with spring 180 at a position generally midway between the two stable positions. Moreover, when clamp elements 170 are in their film engaging position, camming surfaces 185 are still engaged with spring 180 to provide a clamping force on film 15. Spring 180 is preferably stressed beyond its elastic limit prior to assembling the turntable in order to provide a relatively constant force independent of tolerance. In order to facilitate manual manipulation of clamp elements 170, each clamp element is provided with a slot 190 into to which a user may insert a fingernail in order to effect a lifting of the clamp element.

Loading of film is accomplished by opening door 18 in order to gain access to the interior of reader 10. A flat plate 192 covers the rack and spur gear mechanisms, being slotted to permit translational movement of turntable 105. Plate 192 also serves the function of guiding the film into the region between film gate 60 and platen surface 55. Loading of film 15 is most easily accomplished with turntable 105 at a maximum separation from optical block 45 so that only an edge of film disc 15 need be inserted into the film gate with a minimum amount of bending. Door 13 engages a latch 195 which maintains the door in a latched position unless carriage 107 is moved to a position of maximum separation from optical block 45. A portion of carriage 107 contacts latch 195 at the position of maximum separation in order to effect opening. Thus, slide element 24 also serves as a door control near one end of its travel.

While the above provides a full and complete disclosure of the preferred embodiments of the invention, various modifications, alternate constructions, and equivalents may be employed without departing from the true spirit and scope of the invention. For example, the film gate and platen could be modified such that the platen surface would be on two parallel protrusions rather than a generally annular area to reduce contact with the data carrying portions of the emulsion surface. The optical system of the present invention could be used in connection with microfilm data stored in cassette form. In such an embodiment, the reader would include a motor for transporting the film, and a thumb wheel control would be provided for controlling direction and velocity. Therefore, the above description and illustrations should not be construed as limiting the scope of the invention, which is defined by the appended claims.

What is claimed is:

1. A method of aligning a lens end bulb having a base and a lens for focusing an output beam with respect to a fixed structure such that the output beam is oriented in a first predetermined relationship relative to the fixed structure, comprising the steps of:
    providing a clip having a reference portion, and means for engaging the base;
    rigidly mounting the base to the clip so that the output beam is in a second predetermined relationship with respect to the reference portion of the clip, the clip and bulb defining an assembly; and
    providing clip indexing means on the fixed structure for engaging the reference portion of the clip such that the output beam is in the first predetermined relationship with respect to the fixed structure when the clip indexing means engages the reference portion of the clip.

2. A method of aligning a lens end bulb having a base and a lens for focusing an output beam with respect to a fixed structure such that the output beam is oriented in a first predetermined relationship relative to the fixed structure, comprising the steps of:
    providing a clip having a reference portion and means for engaging the base;
    rigidly mounting the base to the clip so that the output beam is in a second predetermined relationship with respect to the reference portion of the clip, the clip and bulb defining an assembly, the second predetermined relationship being such that the output beam is in the first predetermined relationship with respect to the fixed structure when the reference portion of the clip is engaged by indexing portions on the fixed structure.

3. The method of claim 1 or 2 wherein the clip is metal and wherein the step of rigidly mounting the base to the clip comprises the step of soldering the base to the clip to provide a mechanical and electrical connection.

4. The method of claim 1 or 2 wherein the clip is oversized with respect to a dimension of the bulb to facilitate handling of the assembly.

5. A method of aligning a lens end bulb having a base and a lens for focusing an output beam with respect to a fixed structure such that the output beam is oriented in a first predetermined relationship relative to the fixed structure, comprising the steps of:
    providing an oversized metallic clip having a reference portion;
    soldering the base to the clip so that the output beam is in a second predetermined relationship with respect to the reference portion, the clip and bulb defining an assembly, the second predetermined relationship being such that the output beam is in the first predetermined relationship with respect to the fixed structure when the reference portion of the clip is engaged by indexing portions on the fixed structure.

* * * * *